United States Patent Office 3,636,003
Patented Jan. 18, 1972

3,636,003
SUBSTITUTED 2-MERCAPTOIMIDAZOLE DERIVATIVES
Karl J. Doebel, Ossining, N.Y., and Andre R. Gagneux, Basel, Switzerland, assignors to Geigy Chemical Corporation, Greenburgh, N.Y.
No Drawing. Continuation-in-part of applications Ser. No. 721,928, Apr. 17, 1968, now Patent No. 3,488,423, and Ser. No. 721,930, Apr. 17, 1968, now Patent No. 3,505,350, which is a continuation-in-part of application Ser. No. 500,245, Oct. 21, 1965, which in turn is a continuation-in-part of application Ser. No. 204,643, June 22, 1962. This application Nov. 17, 1969, Ser. No. 877,483
Int. Cl. C07d 49/36
U.S. Cl. 260—309
6 Claims

ABSTRACT OF THE DISCLOSURE

The compounds are of the class of substituted 2-mercaptoimidazole derivatives which have anti-inflammatory utility. An illustrative example is 1-(4-fluorophenyl)-5-methyl-2-imidazolemercaptoacetic acid.

CROSS-REFERENCE TO RELATED CASES

This application is a continuation-in-part of applications Ser. Nos. 721,930, now U.S. Pat. 3,505,350, and 721,928, now U.S. Pat. 3,488,423, both filed Apr. 17, 1968 which are continuation-in-part applications of Ser. No. 500,245, filed Oct. 21, 1965, now abandoned, which in turn is a continuation-in-part of application Ser. No. 204,643, filed June 22, 1962, now abandoned.

DETAILED DISCLOSURE

This invention relates to certain derivatives of 2-mercaptoimidazole which possess valuable pharmaceutical properties.

More specifically, the compounds of this invention pertain to compounds of the formula

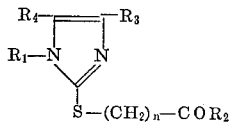

wherein $R_1$ is lower alkyl, phenyl substituted by lower alkyl, lower alkoxy, halogen or trifluoromethyl;
$R_2$ is hydroxy or lower alkoxy;
$R_3$ is hydrogen or lower alkyl;
$R_4$ is lower alkyl, phenyl or phenyl substituted; lower alkyl, lower alkoxy, halogen or trifluoromethyl; and
$n$ is 0 or 1;

provided that $R_1$ is lower alkyl only when $R_4$ is phenyl or substituted phenyl, or a pharmaceutically acceptable acid addition salt thereof.

The term "lower alkyl" as used herein per se or as included in the term "lower alkoxy" means saturated monovalent aliphatic radicals of the formula $-C_mH_{2m+1}$ wherein $m$ designates an integer of less than 6 and is inclusive of both straight chain and branched chain radicals.

The term "halogen" denotes fluorine, bromine, chlorine and iodine.

The present invention comprehends not only the above-described derivatives of 2-mercaptoimidazole in its free base form, but it also includes pharmaceutically acceptable, non-toxic acid addition salts thereof. Such salts are derived from inorganic and organic acids, such as hydrohalic acids, especially hydrochloric and hydrobromic acids, sulfuric, aminoacetic, lactic, succinic, malic, aconitic, phthalic, tartaric acids, etc.

The compounds defined by the above formula can be synthesized, for example, by alkylating or acylating compounds having a free mercapto group in 2-position by means of an alkylating or acylating agent such as, for instance, a halo fatty acid or halo fatty esters. The preparation of compounds having a free mercapto group in 2-position is described more fully in copending applications Ser. No. 721,930, now U.S. Pat. 3,505,350, and Ser. No. 721,928, now U.S. Pat. 3,488,423, both filed on Apr. 17, 1968.

The methods for the preparation of these compounds can be exemplified more fully by the following illustrative examples. The temperatures therein are given in degrees centigrade.

EXAMPLE 1

1-butyl-5-methyl-2-(carboethoxymercapto)imidazole hydrochloride 2.17 g. of ethyl chloroformate was added to a cooled suspension of 1.7 g. of 1-butyl-5-methyl-2-mercaptoimidazole in 10 ml. of anhydrous benzene. The mixture was stirred at room temperature for 2 hours, and solid product was collected. Recrystallization from 30 ml. of ethyl acetate-isopropanol gave the desired product. Recrystallization can also be achieved from isopropanolethyl ether.

Analysis.—Calcd. for $C_{11}H_{19}N_2O_2SCl$ (percent): (M.W. 278.81). C, 47.38; H, 6.87; N, 10.05; S, 11.50; Cl, 12.72. Found (percent): C, 47.01; H, 6.96; N, 10.19; S, 11.59; Cl, 12.52.

EXAMPLE 2

1-(4-fluorophenyl)-5-methyl-2-imidazolemercaptoacetic acid 7.3 g. of 1-(4-fluorophenyl)-5-methyl-2-mercaptoimidazole was suspended in 5% aqueous sodium hydroxide solution. Then 3.85 g. of chloroacetic acid was added and the mixture stirred at room temperature overnight (18 hours). The resulting solution was acidified to pH 1–2 with conc. hydrochloric acid and extracted with chloroform (7×200 ml.). The crude product was recrystallized three times from benzene (150 ml.) to give the desired compound, M.P. 164–166°.

Analysis.—Calcd. for $C_{12}H_{11}FN_2O_2S$ (percent): (M.W. 266.30). C, 54.12; H, 4.17; N, 10.52. Found (percent): C, 53.86; H, 4.07; N, 10.52.

EXAMPLE 3

Methyl 1-methyl-5-(p-chlorophenyl)-2-imidazole mercaptoacetate

A mixture of 4.58 g. of methyl bromoacetate and 2.25 g. of 1-methyl-5-(p-chlorophenyl)-2-mercaptoimizadole in 25 ml. of methanol was refluxed for two hours and evaporated to dryness. Then 10 ml. of water was added and the mixture was made basic to pH 9–10 with saturated sodium carbonate solution. The desired product was filtered off, washed with water, and recrystallized from 15 ml. of isopropanol, M.P. 98–100° C.

Analysis.—Calcd. for $C_{13}H_{13}ClN_2O_2S$ (percent): C, 52.62; H, 4.41; N, 9.44; Cl, 11.95; S, 10.81. Found (percent): C, 52.72; H, 4.51; N, 9.40; Cl, 12.08; S, 10.77.

EXAMPLE 4

1-methyl-5-(p-chlorophenyl)-2-imidazolemercaptoacetic acid

A suspension of 12 g. of 1-methyl-5-(p-chlorophenyl)-2-imidazolemercaptoacetic acid methyl ester in 120 ml.

of 1 N sodium hydroxide was stirred at room temperature for 5 hours and filtered. The filtrate was washed with ether, acidified to pH 5 with 3 N hydrochloric acid and the precipitate filtered off. On recrystallization from 85 ml. of isopropanol, the desired compound obtained melted at 176-178° C.

*Analysis.*—Calcd. for $C_{12}H_{11}ClN_2O_2S$ (percent): C, 50.97; H, 3.92; N, 9.91; Cl, 12.54; S, 11.34. Found (percent): C, 50.97; H. 3.71; N, 9.94; Cl, 12.60; S, 11.18.

EXAMPLE 5

1-p-fluorophenyl-5-methyl-2-(carboethoxymercapto) imidazole hydrochloride

An amount of 2.17 g. of ethylchloroformate was added dropwise to a suspension of 2.08 g. of 1-p-fluorophenyl-5-methyl-2-mercaptoimidazole in 10 ml. of anhydrous benzene. The mixture was stirred at room temperature over night. The desired compound was collected. The yield was 2.09 g. M.P. 133–135° C. with decomposition.

As indicated above, the compounds described hereinabove can be employed a santi-inflammatory agents to treat the four cardinal symptoms of inflammation: swelling, redness, pain and heat. The anti-inflammatory effect in warm-blooded animals was determined by the carrageenin test as follows:

ANTI-INFLAMMATORY: CARRAGEENIN TEST

Male rats, five per group, weighing between 150–200 g., were given the test compounds orally one hour before carrageenin, 0.1 cc. of carrageenin with injected into the plantar area of the right hind paw. Three hours after administration of carrageenin and four hours after administration of test compounds or vehicle, the rats were sacrificed. Right and left hind paws were removed and weighed. The difference between these paws was determined for all animals within a group and the average difference calculated. The average difference of the vehicle control group was used as a point of comparison for test groups. If the average difference for a test group was smaller that that of the vehicle control, protection is present and is expressed in percentage of vehicle control. Illustratively, 1 - (4 - fluorophenyl)-5-methyl-2-imidazole mercaptoacetic acid was administered. 100 mg./kg. resulted in a protection of 21%.

The anti-inflammatory agents of this invention can be administered by any of the conventional means available for use in conjunction with pharmaceuticals. Pharmaceutical compositions in dosage unit form comprise about 10 mg. to about 500 mg. of the active ingredients.

To produce dosage units for peroral application, the active substances of general Formula 1 or a salt thereof is combined, e.g. with solid powdered carriers such as lactose, sucrose, sorbitol, mannitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights may be added, to form compressed tablets or core tablets for sugar coating. The latter are coated, for example, with concentrated sugar solutions which e.g. can contain gum arabic, talcum and/or titanium dioxide, or they are coated with a lacquer dissolved in easily volatile organic solvents or mixture of organic solvents. Dyestuffs can be added to these coatings, for example, to distinguish between different contents of active substance. Soft gelatin capsules (pearl-shaped closed capsules) and other capsules consist for example of a mixture of gelatin and glycerin and contain, e.g. mixtures of the active substance or a suitable salt thereof with Carbowax and hard gelatin capsules contain, for example, granulates of the active substance or a suitable salt thereof with solid, powdered carriers such as, e.g. lactose, sucrose, sorbitol, mannitol; starches such as potato starch, corn starch or amylopectin, cellulose derivatives or gelatin, as well as magnesium stearate or stearic acid. Suppositories are employed as dosage units for rectal application. These consist of a combination of the active substance or a suitable salt thereof with a neutral fatty base, or also gelatin rectal capsules can be employed which consist of a combination of the active substance of a suitable salt thereof with polyethylene glycols (Carbowaxes) of suitable molecular weight.

Ampules for parenteral, particularly intramuscular administration preferably contain a water soluble salt of the active substance of Formula 1 and suitable stabilizing agents and, if necessary, buffer substances in aqueous solution. Anti-oxidizing agents such as sodium bisulfite, sodium sulfite, ascorbic acid or Rongalit (formaldehyde-sodium bisulfite compound) are suitable as stabilizing agents either alone or combined, in total concentrations between about 0.01 and about 0.5 percent. Because of its ability to form chelates, ascorbic acid has an additional stabilizing effect; in this function it can also be replaced by other chelate formers. The best stability of the active ingredient is attained, e.g. by mixtures in suitable ratio of sodium sulfite, sodium bisulfite and/or ascorbic acid, or by the addition of other buffer substances such as citric acid and/or salts thereof. In addition, the ampules can contain a slight amount of a usual preservative.

Useful pharmaceutical formulations for administration of the compounds of this invention may be illustrated as follows:

Capsules: | Mg.
--- | ---
Active ingredient | 10–500
Lactose | 20–100
Corn starch, U.S.P. | 20–100
Aerosolized silica gel | 2–4
Magnesium stearate | 1–2

Tablets | Mg.
--- | ---
Active ingredient | 100
Microcrystalline cellulose | 50
Corn starch, U.S.P. | 80
Lactose, U.S.P. | 50
Magnesium stearate, U.S.P. | 2

This tablet can also be sugar coated according to the usual art practices. Colors may be added to the coating.

Chewable tablets: | Mg.
--- | ---
Active ingredient | 100
Mannitol, N.F. | 100
Flavor | 1
Magnesium stearate, U.S.P. | 2

Suppositories: | 
--- | ---
Active ingredient | 100
Suppository base | 1900

Liquid: | Percent
--- | ---
Active ingredient | 2.0
Polyethylene glycol 300, N.F. | 10.0
Glycerin | 5.0
Sodium bisulfite | 0.02
Sorbitol solution 70%, U.S.P. | 50.0
Methylparaben, U.S.P. | 0.1
Propylparaben, U.S.P. | 0.2
Distilled water, U.S.P. qs. 100.0 cc.

Injectable:
 Active ingredient—25.0 mg.
 Polyethylene glycol 600—1.0 cc.
 Sodium bisulfite, U.S.P.—0.4 mg.
 Water for injection, U.S.P. qs. 2.0 cc.

The amount of these compounds which is administered in use to effect an anti-inflammatory response must in all cases be adjusted to the mammal being treated, its age, weight and condition, as well as the degree of response required. Thus, while an anti-inflammatory response is observed in the range of about 0.1 mg./kg. to about 300 mg./kg., preferably about 1 mg./kg. to about 100 mg./kg., the actual dose should be carefully titrated to the particular subject in accordance with well-recognized principles of pharmacology.

What is claimed is:

1. A compound of the formula:

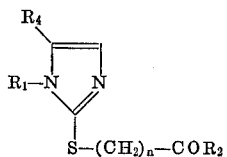

wherein
one of $R_1$ and $R_4$ is lower alkyl and
the other of $R_1$ and $R_4$ is halophenyl,
$R_2$ is hydroxy or lower alkoxy, and
$n$ is 0 or 1.

2. A pharmaceutically acceptable acid addition salt of a compound according to claim 1.

3. The compound according to claim 1 which is 1-(4-fluorophenyl)-5-methyl-2-imidazolemercaptoacetic acid.

4. The compound according to claim 1 which is methyl 1-methyl-5-(p-chlorophenyl)-2-imidazolemercaptoacetate.

5. The compound according to claim 1 which is 1-methyl-5-(p - chlorophenyl)-2-imidazole mercaptoacetic acid.

6. The compound according to claim 1 which is 1-p-fluorophenyl - 5 - methyl - 2 - (carboethoxymercapto) imidazole.

References Cited

UNITED STATES PATENTS

Re. 24,505    7/1958    Rimington et al. _____ 260—309

OTHER REFERENCES

Bhatt et al.: Chem. Abstr., vol. 42, column 8799 (1948).
Bhatt et al.: Chem. Abstr., vol. 48, column 3967 (1954).
Hofmann: Imidazole and its Derivatives, Part I, pages 77–8, N.Y., Interscience, 1953.
Kochergin: Chem. Abstr., vol. 57, column 2208 (1962).
Kochergin: Zh. Obshch. Khim., vol. 31, pages 3257–61 (1961).
Kochergin: Zh. Obshch. Khim., vol. 31, pages 3262–6 (1961).
Lawson et al.: J. Chem. Soc., 1956, pages 1103–8.
Soper et al.: J. Amer. Chem. Soc., vol. 70, pages 2849–55 (1948).

NATALIE TROUSOF, Primary Examiner

U.S. Cl. X.R.

424—273